(No Model.)

S. FREEMAN.
HORSE CHECKING DEVICE.

No. 456,235. Patented July 21, 1891.

Witnesses.
G. Levrich
Geo. R. Ferguson

Inventor.
Silas Freeman

UNITED STATES PATENT OFFICE.

SELIM FREEMAN, OF SOUTH ORANGE, NEW JERSEY.

HORSE-CHECKING DEVICE.

SPECIFICATION forming part of Letters Patent No. 456,235, dated July 21, 1891.

Application filed December 31, 1890. Serial No. 376,430. (No model.)

*To all whom it may concern:*

Be it known that I, SELIM FREEMAN, a citizen of the United States, residing in the township of South Orange, in the county of Essex, and State of New Jersey, have invented a new and useful Improvement in Bridles and Bits for the Guidance and Control of Horses, of which the following is a specification.

My invention relates to an automatic device attached to and a part of the bridle and bit to render more certain and effectual the control by a driver or rider of a fractious or running horse to which the device is applied.

Figure 1:
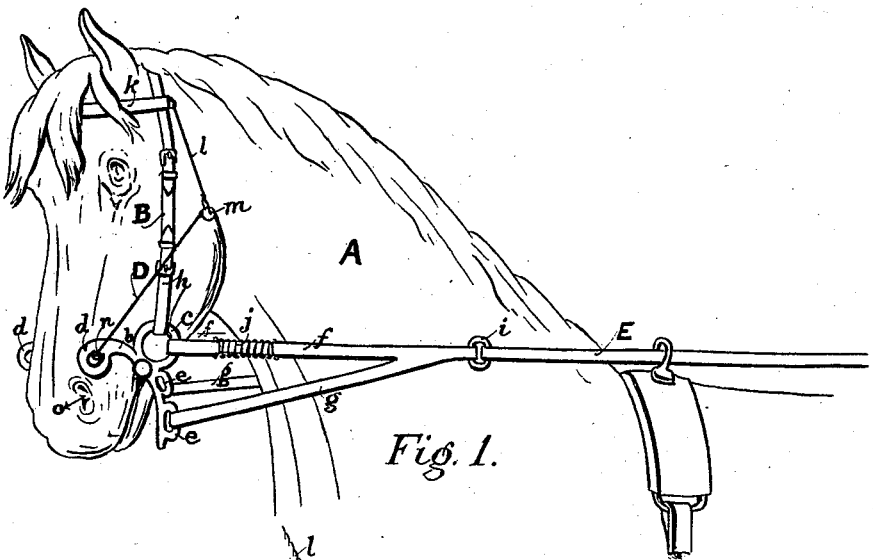
Figure 2:
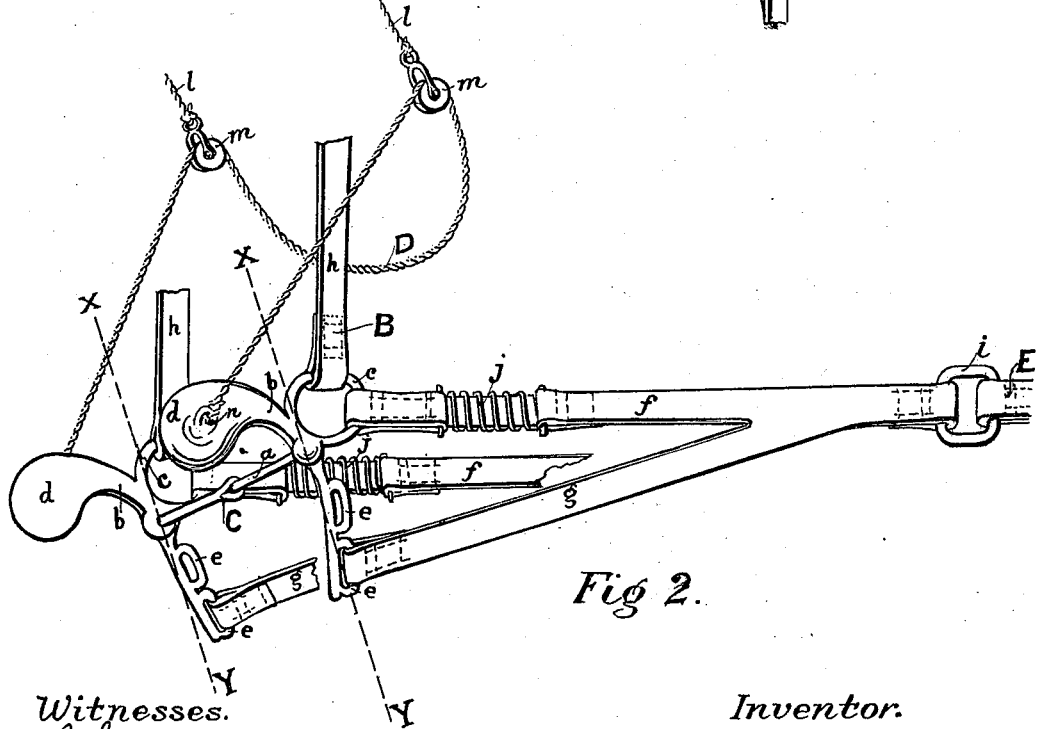

Accompanying and a part of this specification are the drawings, Figure 1 showing the head, neck, and back of a horse and the bridle, bit, and reins in place, arranged for driving; and Fig. 2 showing a part of the bridle, the bit, and the reins in position, the same as in Fig. 1, but without the horse.

On the horse A is the bridle B, with the bit C, the neck-cord D, and the reins E E attached. The bit has a bit-bar $a$, either straight, curved, jointed, or of any other usual form, and the check-pieces $b\,b$, each jointed near its center to the bit-bar. Forming a part of each check-piece is the ring $c$, placed somewhat above the joint, the curved pad $d$ at the upper end and the loops $e\,e$ at the lower end. The lower part of each check-piece is inclined inward from the axes $x\,y$ of its joint with the bit-bar. These axes are normal to the bit-bar and parallel.

Each rein E is divided near the outer end into two branches, the upper branch $f$ and a side strap $h$ of the bridle being buckled into a ring $c$ and the lower branch $g$ into one of the loops $e$. These branches and the back part of the rein may be in one piece, the whole thus forming a fork; or the branches may be attached to this back part by means of a link $i$, as shown. In the upper branch and a part of it is a tension-spring $j$, which may be of wire coiled and flattened, of elastic webbing, or otherwise, as most suitable for the purpose intended.

To the upper end of the bridle, at or near where the head-piece $k$ joins the side straps and on each side is fastened a stay $l$, which carries at its lower end a pulley or loop $m$. Through each of these loops or pulleys is passed a free end of the neck-cord D, so that the middle of the cord between the loops or pulleys goes around underneath the throat of the horse, as shown. The free ends of this cord are fastened, one to each pad, at $n$, a point at or near the center of the pad.

The operation of this device is as follows: the tension-springs being regulated to withstand without yielding such a pull on the reins as is necessary to ordinarily guide or restrain the horse and the neck-cord drawn up quite close underneath the horse's throat, all as shown in Fig. 1. Whenever the horse becomes fractious or attempts to run and the pull on the reins is increased by the driver, the tension-springs will yield, the upper branches of the reins will elongate, the lower branches taking the stress will rotate the bit slightly in the horse's mouth and at the same time each check-piece about its joint in the bit-bar, whereby the pads each will be forced forward and downward over and closing a nostril $o$. This rotative movement of the bit will also tighten the neck-cord underneath the horse's throat, whereby so long as the increased pull on the reins is continued the horse will be prevented from breathing and he will be effectually subdued and tamed. As the reins are relaxed the tension-springs will contract, the branches, bit, and neck-cord will resume their normal position, as shown in the drawings, and the horse will be relieved from undue constraint.

Having thus described my invention, what I claim as new, and desire to secure by Letters Patent, is—

1. In a device for checking horses, the combination of a pair of check-pieces, a jointed bit-bar connecting the same, a head-band for supporting the check-pieces and bit-bar in position, nostril-pads on the upper ends of the check-pieces, and divided reins having upper elastic branches attached to each check-piece above the connection with the bit-bar and lower inelastic branches attached to the lower ends of the check-pieces, substantially as described.

2. In a device for checking horses, the combination of a pair of check-pieces, a bit-bar connecting the same and supported in position by a head-band, a noose connecting the upper ends of the check-pieces and running over pulleys attached to the ends of a support passing over the horse's head, and divided reins attached to the check-pieces above and below the connections with the bit-bar by upper elastic and lower inelastic branches, respectively, substantially as described.

3. In a device for checking horses, the combination of a pair of check-pieces, a jointed bit-bar connecting the same, nostril-pads upon the upper ends of said check-pieces, all supported in position by a head-band, a noose connecting the nostril-pads and running through pulleys attached to the ends of a support which passes over the horse's head, and divided reins attached by branches to the check-pieces above and below the connections with the bit-bar, each upper branch being elastic and each lower branch being inelastic, substantially as described.

4. In a device for checking horses, the combination of a pair of check-pieces, each provided with a nostril-pad and an eye at its upper end, a jointed bit connecting the check-pieces, a noose attached to the upper eyes and running through pulleys supported upon the horse's head adjusted to pass under the horse's throat, an eye upon each check-piece, located at or above the connection with the bit-bar, a head-band connecting said eyes, and divided reins, each rein having an upper elastic branch attached to one of said eyes and a lower inelastic branch attached to an eye on the lower end of each check-piece, substantially as described.

SELIM FREEMAN.

Witnesses:
 LEWIS P. TAYLOR,
 A. S. TAYLOR.